US006222686B1

United States Patent
Richard

(10) Patent No.: US 6,222,686 B1
(45) Date of Patent: Apr. 24, 2001

(54) GRADIENT INDEX MAGNIFYING LENS

(75) Inventor: Fred Vincent Richard, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/425,855

(22) Filed: Oct. 22, 1999

(51) Int. Cl.[7] .............................. G02B 27/02; G02B 27/10
(52) U.S. Cl. ........................ 359/802; 359/619; 359/800; 359/803
(58) Field of Search ...................... 359/800, 798, 359/799, 802, 807, 803, 804, 565, 567, 569, 676, 887, 888, 619

(56) References Cited

U.S. PATENT DOCUMENTS

| | | | |
|---|---|---|---|
| 4,394,083 | * 7/1983 | Rees | 355/1 |
| 4,929,065 | 5/1990 | Hagerty et al. | 350/413 |
| 5,630,857 | 5/1997 | Xu et al. | 65/173 |
| 5,633,762 | 5/1997 | Richard | 359/817 |
| 5,644,323 | * 7/1997 | Hilderbrand et al. | 345/8 |
| 5,689,374 | * 11/1997 | Xu et al. | 359/652 |
| 5,818,634 | 10/1998 | Richard et al. | 359/565 |
| 5,870,068 | * 2/1999 | Hilderbrand | 345/8 |
| 5,936,777 | 8/1999 | Dempewolf | 359/653 |
| 6,055,110 | * 4/2000 | Kintz et al. | 359/637 |
| 6,094,181 | * 7/2000 | Hilderbrand et al. | 345/8 |
| 6,130,787 | * 10/2000 | Tsuchida | 359/654 |
| 6,137,525 | * 10/2000 | Lee et al. | 348/14 |

* cited by examiner

Primary Examiner—Georgia Epps
Assistant Examiner—Saeed Seyrafi
(74) Attorney, Agent, or Firm—Robert F. Hightower

(57) ABSTRACT

An optical display system for magnifying the image of a liquid crystal display cell (314) used in a portable electronic device (310) such as a cellular phone or smart card reader having a light focusing and deflecting array (316), a light coupling element (318) and a magnifying lens element (110). The light focusing and deflecting array (316) includes an array of lenslets (410, 412, 414, 416, 418) that receive light rays from the liquid crystal display cell (314) and impart an angular component to the light rays. The magnitude of this angular component increases moving radially outward along the light focusing and deflecting array. The light coupling element (318) couples the deflected light rays to the magnifying lens element without substantial refraction thereof. The magnifying lens element (110) has a unitary lens having a biaxial gradient index of refraction, which causes the light rays to be bent initially outward then inward. The combination of light focusing and deflecting array (316), light coupling element (318) and magnifying lens element (110) produce a magnified image of liquid crystal display cell (314) within a very low profile package.

11 Claims, 2 Drawing Sheets

GRADIENT INDEX MAGNIFYING LENS

FIELD OF THE INVENTION

The present invention is generally directed to optical elements and, more particularly, to apparatus for magnifying an image displayed by a display device such as a Liquid Crystal Display cell.

BACKGROUND OF THE INVENTION

A major market for optical systems and devices is portable electronics equipment such as cellular telephones, pagers, portable computers and the like. Generally, it is desirable for the information displays used in devices of this type to be compact with low power requirements, inexpensive and yet capable of providing a high quality image. As larger and more complex messages are being sent to remote units and more information is being displayed on portable computers, the ability of the display to present information to the user in a readable format is becoming more challenging. Prior art systems for displaying large amounts of information typically comprise either a large display that is directly viewed such as is used in a conventional portable laptop computer, or comprise a small image source with high magnification optics which create a high magnification virtual display. The major problem with a direct view system is that it greatly limits the minimum size of the portable electronics on which it is used. This is because the image must be large enough for an operator to read and understand the information being displayed. Thus, for example, in order to display 40 lines of information at a pitch of 10 characters per inch, a conventional laptop computer display must be on the order of 20 centimeters by 25 centimeters. Such a display would clearly be too large to be incorporated into most portable communications devices such as pagers, cellular telephones and the like.

In typical designs of virtual image optical systems, the elements composing the magnification optics typically have surfaces with significant curvatures, in order to achieve the desired magnification levels in a relatively compact package. These elements typically have small numerical apertures which increases the illumination requirements of the display device. Further, the steep curvature of these optical elements produce significant spherical and chromatic aberrations which must be corrected by additional optical elements thereby increasing the size, cost and power requirements of the optical system.

Radially gradient index (GRIN) glass cylinder lenses with flat surfaces at both ends have been suggested as possible substitutes for homogeneous glass lenses in an optical system. The advantage of the GRIN lens is that the numerical aperture of a flat cylinder lens is substantially greater than an equally sized homogeneous glass lens and a GRIN lens produces fewer monochromatic and chromatic aberrations. Accordingly, GRIN lens elements have found substantial use in optical systems to correct monochromatic and chromatic lens aberrations.

It has been suggested that axially gradient index of refraction glass lenses such as axial GRADIUM manufactured by LightPath Technologies, Inc. may also be suitable for fabricating lenses with reduced aberrations and as light coupling elements. For example, in U.S. Pat. No. 5,936,777 to Dempewolf, there is disclosed an optical coupler comprising a single lens having two axially gradient index of refraction elements joined along their respective high refractive index surfaces that are used as a coupler having an optical axis normal to the index of refraction gradient.

What has not been taught or suggested by the prior art, however, is that a biaxially gradient index of refraction lens having an optical axis parallel to the refractive index gradient can be utilized as a highly efficient, compact, magnification lens suitable for use in magnifying, for example, a miniature display element contained in a portable electronic device.

BRIEF DESCRIPTION OF THE DRAWINGS

The invention will be better understood from a reading of the following detailed description, taken in conjunction with the drawings in which like references are used to identify like elements and in which.

DETAILED DESCRIPTION OF THE DRAWINGS

Axially gradient index of refraction lenses, such as the proprietary axial GRADIUM lenses, are fabricated from flat glass slabs with pre-designed refractive index perturbations within it, which can enhance functionality compared to a conventional constant index lens. The fabrication of axial GRADIUM lens blanks has been described elsewhere; for example in U.S. Pat. No. 4,929,065, incorporated herein by reference. Essentially, the process involves stacking a plurality of glass plates, each of a different but isotropic refractive index, to form a stack, which is then fused at a sufficiently high temperature to cause inter-diffusion of elements of the composition, thereby forming a unitary glass body. The particular profile of the index of refraction within the unitary glass body, whether linear, parabolic, quadratic, cubic, etc., is achieved by control of the thicknesses and compositions of the individual glass plates.

In another approach, as disclosed in U.S. Pat. No. 5,630,857, glass frit may be used to form the lens blank. In this case, the desired profile may be fabricated based on the weight of frit having a particular index of refraction. Knowing the density of a particular glass composition permits conversion of plate thickness to weight.

The unitary glass body, or boule, that is formed by heating the glass plate or glass frit to a sufficiently high temperature for a period of time is then core-drilled to provide a plurality of glass blanks which are then ground and polished to provide lenses. A variety of lens surfaces may be formed including planar, concave, convex, cylindrical, and other combinations.

Figure 1:
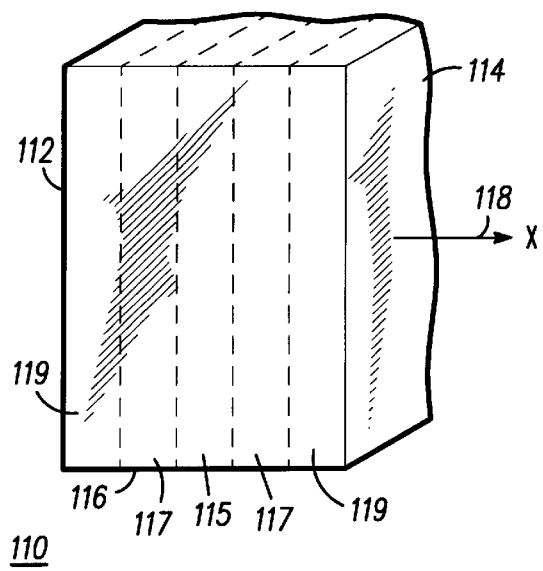
FIG. 1 is a partial perspective view of a biaxial gradient index lens element in accordance with an embodiment of the present invention.

FIG. 1 is a partial perspective view of a biaxial gradient index lens element in accordance with an embodiment of the present invention. As shown in FIG. 1, lens element 110 has a first high index face 112, a second high index face 114 and a locally minimum index plane 116 intermediate between face 112 and face 114. Faces 112 and 114 are ground parallel to the isoindex planes of lens element 110 to define an optical axis 118. Lens element 110 may be fabricated by, for example, fusing together layers having progressively lower refractive indices until a plate having a desired low refractive index is fused and then fusing together layers having progressively higher refractive indices until lens element 110 has a desired index of refraction. By way of example, layer 115 is sandwiched between layers 117, wherein layer 115 has a lower refractive index than layers 117. Likewise, layers 117 are sandwiched between layers 115 and 119, wherein layers 117 have a lower index of refraction than layers 119. Fusing index layers in this fashion forms a lens element having a continuously varying refractive index from index face 112 to index face 114. The layers can be fused to form a composite structure by heating and interdiffusing the layers. Although lens element 110 has been shown and described as comprising five layers, it should be understood this is not a limitation of the present invention. There may be a larger number or a fewer number of layers depending on the desired overall refractive index of lens element 110.

Figure 2:
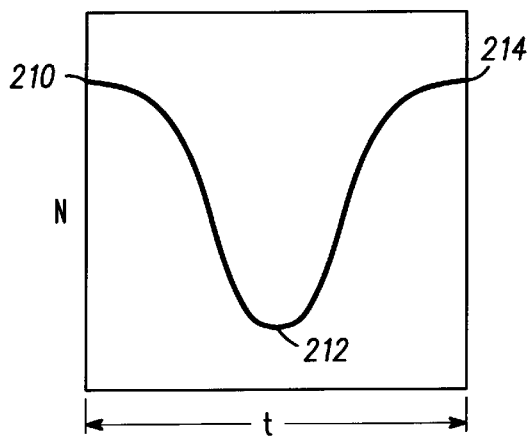
FIG. 2 is a graphical representation of the change of refractive index of the biaxial gradient index lens element of FIG. 1 with respect to distance.

FIG. 2 is a graphical representation of the change in refractive index "N" of lens element 110 with respect to distance x taken along a plane parallel to optical axis 118 through the total thickness "t" of lens element 110. As can be determined from an inspection of FIG. 2, the optical index "N" decreases from a first local maximum value 210 at first high index face 112 to a local minimum value 212 at locally minimum index plane 116. Then the index of refraction gradually increases from local minimum value 212 to a second local maximum value 214 proximal surface 114 of lens element 110. In the illustrative embodiment, an experimental gradium material having a maximum refractive index of 1.825 and a minimum index of refraction of 1.525 and a thickness "t" along the optical axis of 3.8 millimeters is utilized. As described more fully hereinafter, lens element 110 thus configured is capable of acting as a magnifying lens or pre-lens in an optical display system.

Figure 3:
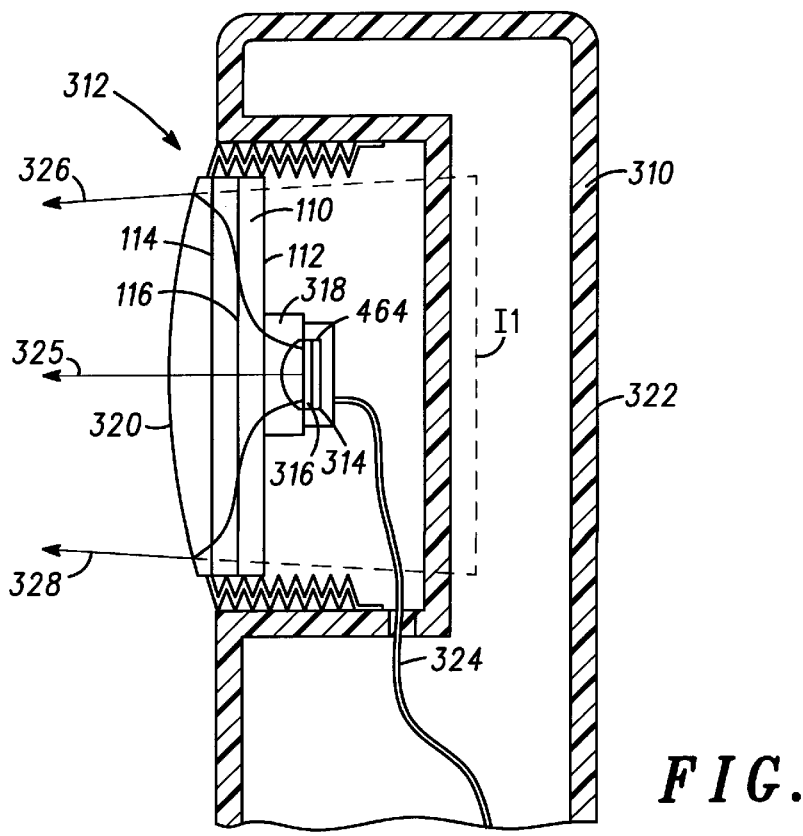
FIG. 3 is a side elevational sectioned view of a portable electronic device including an optical display system in accordance with another embodiment of the present invention.

With reference to FIG. 3, lens element 110 is incorporated into a portable electronic device 310 which may be a cellular telephone, alpha-numeric pager or other device having a display for displaying information to the user. For clarity, the gradient shading of FIG. 1 is omitted from this and subsequent figures. However, the high index faces 112 and 114 are indicated by solid lines, as is the locally minimum index plane 116. Lens element 110 is incorporated into a display apparatus 312 comprising a liquid crystal display cell 314, a focusing and deflecting array lens 316, a light coupling element 318, lens element 110 and a second magnifying lens 320. Portable electronic device 310 comprises a housing 322 supporting, among other things, display apparatus 312 and, typically, a user input device such as a keypad, card reader, etc. Information from the processor of the portable electronic device 310, as well as power, is supplied to liquid crystal display cell 314 via a conventional multiple track ribbon or other cable 324. Liquid crystal display cell 314 may comprise a Super Video Graphics Adapter (SVGA), a Video Graphics Adapter (VGA), a Quarter Video Graphics Adapter (QVGA) or other display capable of displaying high resolution graphical information. An exemplary QVGA liquid crystal cell comprises a cell having a display area of 4.8 by 3.6 millimeters (320×240 pixels).

As illustrated in FIG. 3, information displayed at the center of liquid crystal display cell 314 (depicted as light ray 325) passes through lens element 110 and second magnifying lens 320 substantially unaltered. However, as illustrated by light ray 326 and light ray 328, information displayed at the edges of liquid crystal display cell 314 enter lens element 110 at an angle with respect to the optical axis of lens element 110 and are initially bent outward toward high index surface 112 as dictated by the laws of physics describing ray propagation in non-homogeneous media. Once the displayed information represented by light rays 326 and 328 reach the locally minimum index plane 116, the rays are bent toward high index surface 114 where they exit surface 114. Since, in the illustrative embodiment of FIG. 3, minimum index plane 116 is equidistant from surfaces 112 and 114, light rays 326 and 328 exit at substantially the same angle as the angle of incidence of the light rays 326 and 328 at surface 112. Light rays exiting surface 114 are then refocused by second magnifying lens 320 to form a virtual image I1 as shown in FIG. 3.

Figure 4:
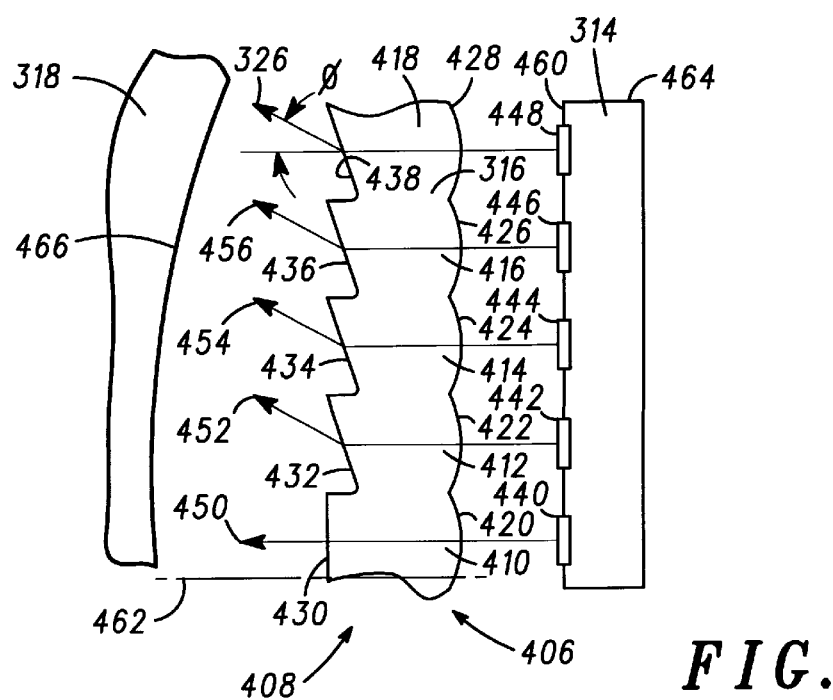
FIG. 4 is an enlarged view of a portion of FIG. 3.

With reference to FIG. 3 and FIG. 4, in order to produce the relatively high entrance angles at surface 112 of lens element 110, a focusing and deflecting array lens 316 is disposed in the optical path between liquid crystal display cell 314 and light coupling element 318 (the function of which is described in greater detail hereinafter). In the illustrative embodiment, focusing and deflecting array lens 316 has a bottom entrance surface 406 and a top exit surface 408 and comprises a plurality of lenslets 410, 412, 414, 416 and 418. Each of lenslets 410–418 comprise a bottom input lens 420, 422, 424, 426 and 428, respectively. These input lenses perform the function of re-imaging each pixel onto surface 114 of lens element 110. Lenslets 410–418 further comprise top surface lens elements 430, 432, 434, 436 and 438, respectively. Bottom input lens elements 420–428 and top surface lens elements 430–438 cooperate to receive light rays 450, 452, 454, 456 and 326 from pixels 440, 442, 444, 446 and 448, respectively, of liquid crystal display cell 314 and bend rays 326, 450–456 through increasingly greater angles with respect to front surface 460 of liquid crystal display cell 314 moving outward from the center line 462 of liquid crystal display cell 314 toward the edges 464 of liquid crystal display cell 314. It should be noted that, although only five lenslets of focusing and deflecting array lens 316 and five pixels of liquid crystal display cell 314 are shown in FIG. 4, the total number of pixels and lenslets will be much greater, up to and including a full 1280 by 960 pixel SVGA display or more. As shown in FIG. 4, light coupling element 318 comprises a bottom entrance surface 466 having a concave profile selected to receive incident light rays 326, 450–456 substantially normal to surface 466. Preferably light coupling element 318 comprises a uniform index of refraction greater than or equal to the index of refraction of first high index face 112 of lens element 110 such that the launch angles of the rays from a given pixel passing through element 318 are maintained as they enter surface 112 of element 110.

The illustrative embodiment can produce a real image on the order of 24.8 by 18.7 millimeters from a QVGA display with 15 micron pixels and an actual size of 4.8 by 3.6 millimeters. As illustrated, if the launch angle φ of the outermost ray 326 is equal to 402 and the ΔN of the gradium material out of which lens element 110 is composed has a ΔN of 0.05 per millimeter and a total thickness of 10 millimeters, the lateral displacement of ray 326 would be approximately 5 millimeters. Similarly, the outermost light ray 328 (FIG. 3) at the opposite edge of liquid crystal display cell 314 would be displaced approximately 5 millimeters in the opposite direction, thereby providing a total lateral displacement of 10 millimeters. The apparent size of the QVGA display at surface 114 of lens element 110 would, therefore, be 24.8 by 18.7 millimeters of the outermost ray 326. For a launch angle φ of 65° the apparent size of a QVGA display would be 65×49 mm. For the latter case, the effective magnification of such an increase in the apparent display size as determined by the angle subtended by the apparent size versus the actual size of the display is equal to approximately 13.3× and is accomplished in a package approximately 20 millimeters thick, including focusing and deflection array lens 316, light coupling element 318 and second magnifying lens 320. Thus, by incorporating a biaxial gradient index lens element 110 into display apparatus 312, in accordance with the present invention, a highly compact, efficient, magnification of liquid crystal display cell 314 can be realized.

Figure 5:
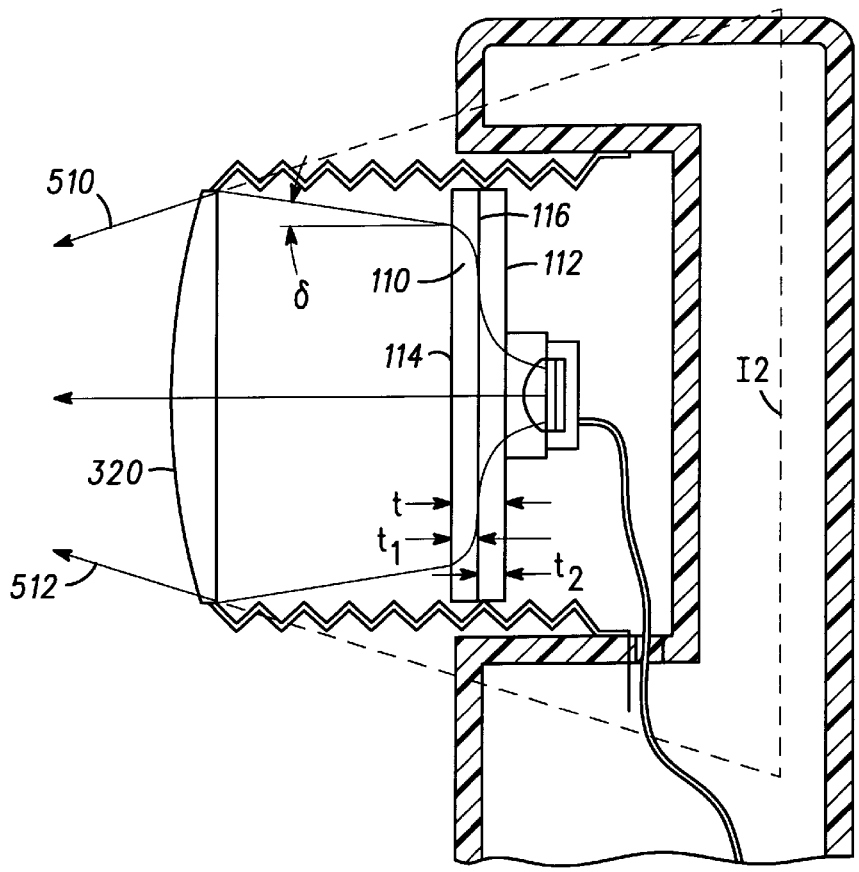
FIG. 5 is a side elevational sectioned view of a portable electronic device incorporating an alternative embodiment of an optical display system in accordance with yet another embodiment of the present invention.

With reference to FIG. 5, a dual mode display apparatus can be realized by permitting second magnification lens element 320 to move relative to front surface 114 of lens element 110. When lens 320 is in contact with element 110, the optical system will provide an effective low magnification image of the display source 314. Elements 320 and 110 combine to produce this effective magnification. As shown in FIG. 5 as lens element 320 moves away from element 110, the outermost light rays 510 and 512 are bent outward toward surface 112 of lens element 110 then bent toward surface 114 of lens element 110 exiting surface 114 at an angle substantially equal to the incident angle of respective light rays 510 and 512 on surface 112. Light rays 510 and 512 are then bent inward by magnification lens 320 to form a virtual image I2 as shown in FIG. 5. Since the real image produced at surface 114 of lens element 110 is already on the order of 24.8 by 18.7 millimeters, it is not necessary that second magnification lens element 320 have a high power. A relatively low power (i.e. 4×magnification) lens can create a very highly magnified image with a large aperture and substantial eye relief thereby making the high magnification mode substantially more comfortable for the user. By adjusting the gradient index profile in the second layer and the total thickness "t1", the angle δ at which light rays 510 and 512 exit surface 114 can be made more or less normal to surface 114 as required.

Although certain preferred embodiments and methods have been disclosed herein, it will be apparent from the foregoing disclosure to those skilled in the art that variations and modifications of such embodiments and methods may be made without departing from the spirit and scope of the invitation. Accordingly, it is intended that the invention shall be limited only to the extent required by the appended claims and the rules and principles of applicable law.

What is claimed is:

1. Apparatus for magnifying an image displayed by a display cell for viewing by a user, said apparatus comprising:
   a first magnifying lens element comprising a unitary lens having a bottom entrance surface on which light from the image impinges, a top exit surface which transmits the light from the image to the user, and an optical axis there between, said unitary lens comprising a gradient index of refraction in planes parallel to said optical axis and a substantially constant index of refraction in planes normal to said optical axis, said gradient index of refraction having a first locally maximum value proximal said bottom entrance surface, a locally minimum value interior of said bottom entrance surface and said top exit surface, and a second locally maximum value proximal said top exit surface; and
   a focusing and deflecting array lens disposed along an optical path between the display and said first light coupling element, said focusing and deflecting array comprising a plurality of lens lets, each of said lens lets having a bottom input surface on which light from the image impinges and a top exit surface which transmits light to said first light coupling element, said focusing and deflecting array lens providing a diverging light path between the display and said first light coupling element, the divergence of the diverging light path increasing in magnitude from the center of the display outward relative to the surface of the display.

2. The apparatus of claim 1, wherein:
   said bottom entrance surface and said top exit surface of said first magnifying lens element each comprises a planar surface.

3. The apparatus of claim 1, further comprising:
   a first light coupling element comprising a plano concave lens having a concave bottom entrance surface on which light from the image impinges and a planar top exit surface, said first light coupling element being supported such that the top exit surface of said light coupling element is in contact with the bottom entrance surface of said first magnifying lens element.

4. The apparatus of claim 3, wherein:
   said first light coupling element comprises an index of refraction substantially equal to the first locally maximum value proximal said bottom entrance surface of said unitary lens.

5. The apparatus of claim 1, further comprising:
   a second magnifying lens element, said second magnifying lens element comprising a convex lens having a bottom input surface and a top exit surface, said second magnifying lens element being supported proximal the top output surface of said first magnifying lens element such that light exiting the top exit surface of said first magnifying lens element impinges the bottom input surface of said second magnifying lens element and is transmitted through said second magnifying lens element to the user.

6. The apparatus of claim 4, wherein:
   said second magnifying lens is supported for movement toward and away from said first magnifying lens element for providing a variable magnification of the image displayed to the user.

7. The apparatus of claim 1, wherein:
   the gradient index of refraction of said first magnifying lens element comprises a substantially parabolic index profile.

8. The apparatus of claim 2, wherein:
   the local minimum index of refraction occurs proximal a plane located at the geometric center between the bottom entrance surface and the top exit surface of said unitary lens.

9. An optical display system comprising:
   a housing;
   a display cell supported by said housing;
   a source of light supported by said housing for illuminating said display cell;
   a first magnifying lens element supported by said housing for receiving and magnifying an image of said display cell and transmitting the magnified image to a user, said first magnifying lens element comprising a unitary lens having a bottom entrance surface on which light from the image impinges, a top exit surface which transmits said light from the image to a user, and an optical axis between said bottom entrance surface and said top exit surface, said unitary lens comprising a gradient index of refraction in planes parallel to said optical axis and a substantially constant index of refraction in planes normal to said optical axis, said gradient index of refraction having a first locally maximum value proximal said bottom entrance surface, a second locally maximum value proximal said top exit surface; and a locally minimum value occurring at a location between said bottom entrance surface and said top exit surface;

a first light coupling element supported by said housing and disposed along an optical path between said display and said first magnifying lens element, said first light coupling element comprising a concave bottom entrance surface on which light from the image impinges and a top exit surface, said first light coupling element being supported such that the top exit surface of said light coupling element is in contact with the bottom entrance surface of said first magnifying lens element; and a focusing and deflecting array lens supported by said housing and disposed along an optical path between the display and said first light coupling element, said focusing and deflecting array comprising a plurality of lenslets, each of said lenslets having a bottom input surface on which light from the image impinges and a top exit surface which transmits light to said first light coupling element, said focusing and deflecting array lens providing a diverging light path between the display and said first light coupling element, the diverging light path having divergence that increases in magnitude from the center of the display outward relative to the surface of the display.

10. The optical display system of claim 9, further comprising a second magnifying lens supported by said housing and disposed along an optical path between the first magnifying lens and the user, said second magnifying lens receiving the magnified image from said first magnifying lens element and transmitting the light from the image to the user.

11. The apparatus of claim 9, wherein:

said second magnifying lens element is moveable between a first position in which said optical display system projects an image of relatively lower magnification to the user and a second position in which said optical display system projects an image of relatively higher magnification to the user.

* * * * *